(12) United States Patent
Wang et al.

(10) Patent No.: US 11,473,456 B2
(45) Date of Patent: Oct. 18, 2022

(54) CYLINDER HEAD VALVE SEAT WITH HIGH THERMAL CONDUCTIVITY AND MULTIPLE MATERIAL CROSS-SECTION

(71) Applicant: GM Global Technology Operations LLC, Detroit, MI (US)

(72) Inventors: Qigui Wang, Rochester Hills, MI (US); Devin R. Hess, Clarkston, MI (US); Jeffrey Harris, Detroit, MI (US); Herbert W. Doty, Fenton, MI (US); Dale A. Gerard, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 17/021,417

(22) Filed: Sep. 15, 2020

(65) Prior Publication Data

US 2022/0082035 A1 Mar. 17, 2022

(51) Int. Cl.
| | |
|---|---|
| *F01L 3/00* | (2006.01) |
| *F01L 3/04* | (2006.01) |
| *F02F 1/24* | (2006.01) |
| *B33Y 80/00* | (2015.01) |
| *B22F 10/00* | (2021.01) |

(52) U.S. Cl.
CPC .................. *F01L 3/04* (2013.01); *B33Y 80/00* (2014.12); *F02F 1/24* (2013.01); *B22F 10/00* (2021.01); *F01L 2301/00* (2020.05)

(58) Field of Classification Search
CPC ... F01L 3/02; C22C 1/05; C22C 30/02; Y10T 29/49306; F16K 1/42; F16K 1/425
USPC ........................................................ 123/188.8
See application file for complete search history.

(56) References Cited

U.S. PATENT DOCUMENTS

| | | | | |
|---|---|---|---|---|
| 5,787,853 A * | 8/1998 | Adachi | ...................... | F01L 3/22 |
| | | | | 123/193.5 |
| 5,848,579 A * | 12/1998 | Adachi | ...................... | F02F 1/38 |
| | | | | 123/188.8 |
| 6,039,785 A * | 3/2000 | Dalal | ..................... | B22F 1/0003 |
| | | | | 75/235 |
| 6,323,458 B1 * | 11/2001 | Nomura | ..................... | F01L 3/02 |
| | | | | 219/148 |
| 2002/0121259 A1* | 9/2002 | Mizutani | ............ | B23K 20/1295 |
| | | | | 123/188.8 |
| 2021/0078073 A1* | 3/2021 | Mack | ..................... | C22C 1/0425 |

* cited by examiner

*Primary Examiner* — Long T Tran
*Assistant Examiner* — James J Kim
(74) *Attorney, Agent, or Firm* — Vivacqua Crane PLLC

(57) ABSTRACT

A cylinder head valve seat of an automobile vehicle includes a valve seat having a valve seat surface integrally joined to an engagement end. The engagement end includes multiple materials extending through a cross section of the engagement end. The multiple materials include: a first material having a first thermal conductivity; and a second material having a second thermal conductivity higher than the thermal conductivity of the first material, wherein the first material transitions into the second material.

15 Claims, 2 Drawing Sheets

CYLINDER HEAD VALVE SEAT WITH HIGH THERMAL CONDUCTIVITY AND MULTIPLE MATERIAL CROSS-SECTION

INTRODUCTION

The present disclosure relates to valve seats for automobile vehicle engine cylinder heads.

Automobile vehicle engines commonly include one or more cylinder heads which may be cast from aluminum. Valve seats which valves such as intake and exhaust valves positioned in the cylinder heads seal against are made independently of an iron-based metal via a powdered metallurgy (PM) process which provides improved wear resistance over aluminum. The valve seats are commonly press-fit into machined pockets in the aluminum cylinder head after the cylinder head has been cast. Apertures which receive the valve seats must be accurately positioned to center the valve seats and subsequently the valves.

Material differences between the valve seats and the cylinder head may result in valve seat thermal distortion and wear as the heat in the valve seat cannot dissipate to the aluminum head rapidly because of the presence of possible gaps between the valve seat and the aluminum head. This may cause valve seat leakage. Because the valve seats commonly have a uniform material cross section a thermal conductivity of the valve seats does not change through the cross section and therefore does not allow for different rates of heat transfer which may be desirable to minimize thermal distortion and wear.

Thus, while current automobile vehicle cylinder head valve seats achieve their intended purpose, there is a need for a new and improved cylinder head valve seat and method for manufacturing cylinder head valve seats.

SUMMARY

According to several aspects, a cylinder head valve seat of an automobile vehicle includes a valve seat surface integrally joined to an engagement end. The engagement end includes multiple materials extending through a cross section of the engagement end.

In another aspect of the present disclosure, the multiple materials include materials having differences in thermal conductivity.

In another aspect of the present disclosure, the multiple materials include a first material having a high thermal conductivity such as but not limited to copper.

In another aspect of the present disclosure, the first material has a low copper content, defining a copper content less than approximately 50%.

In another aspect of the present disclosure, the multiple materials include a second material having a high copper content defining a copper content greater than or equal to 90%, and the first material transitions into the second material.

In another aspect of the present disclosure, the first material has a high wear resistance transitioning into a high thermal conductivity material.

In another aspect of the present disclosure, the valve seat defines a printing made of metal powders.

In another aspect of the present disclosure, the metal powders include at least one of a tool steel, a stainless steel, a copper-nickel alloy, a chromium alloy, a cobalt alloy, a tungsten alloy and a nickel alloy.

In another aspect of the present disclosure, the valve seat includes multiple male engagement features extending from an engagement end.

In another aspect of the present disclosure, the multiple male engagement features include multiple first male members extending from a first contact surface of the engagement end and multiple second male members extending from a second contact surface of the engagement end.

According to several aspects, a cylinder head valve seat of an automobile vehicle includes a valve seat having a valve seat surface integrally joined to an engagement end. The engagement end includes multiple materials extending through a cross section of the engagement end. The multiple materials include: a first material having a first thermal conductivity; and a second material having a second thermal conductivity higher than the thermal conductivity of the first material, wherein the first material transitions into the second material.

In another aspect of the present disclosure, the second material has a copper content greater than or equal to 90%.

In another aspect of the present disclosure, the first material has a copper content lower than the copper content of the second material and less than 50%.

In another aspect of the present disclosure, the valve seat includes multiple male engagement features extending from the engagement end.

In another aspect of the present disclosure, the multiple male engagement features include multiple first male members extending from a first contact surface of the engagement end.

In another aspect of the present disclosure, the valve seat defines a printing made of metal powders having the first material transitioning into the second material.

In another aspect of the present disclosure, the first material is welded to the second material defining a junction between the first material and the second material, having the valve seat annealed following welding.

According to several aspects, a method for manufacturing a valve seat for a cylinder head of an automobile vehicle includes: integrally joining a valve seat surface to an engagement end to define a valve seat; forming the engagement end using at least two materials extending at least partially through a cross section of the engagement end; providing a first one of the at least two materials having a first thermal conductivity; adding a second one of the at least two materials having a second thermal conductivity higher than the thermal conductivity of the first material; and transitioning the first material into the second material.

In another aspect of the present disclosure, the method further includes: selecting the second one of the at least two materials having a copper content greater than or equal to 90%; and providing the first one of the at least two materials having a copper content lower than the copper content of the second one of the at least two materials and less than 50%.

In another aspect of the present disclosure, the method further includes: creating multiple male engagement features extending from the engagement end of the valve seat; and forming the multiple male engagement features from the second one of the at least two materials.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
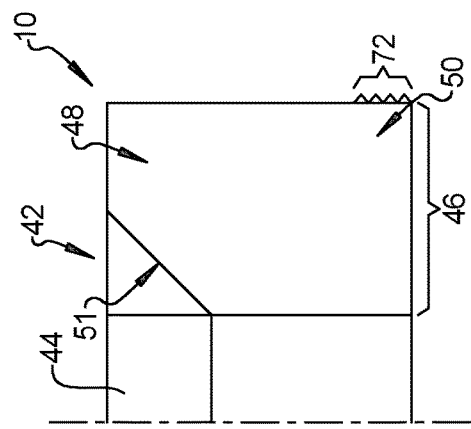
FIG. 1 is a side elevational view of a valve seat according to an exemplary aspect.

Referring to FIG. 1, a cylinder head valve seat and method for manufacturing the cylinder head valve seat 10 may include a valve seat 12 having a valve seat surface 14 integrally joined to an engagement end 16. According to several aspects, materials used for the valve seat 12 include but are not limited to tool steel, stainless steel, copper-nickel alloys, high chromium or cobalt alloys, tungsten alloys, nickel allows and the like. According to several aspects, the engagement end 16 further includes multiple materials of differing thermal conductivity extending through a cross section of the engagement end 16. The multiple materials provide gradient differences in thermal conductivity through the cross section and are therefore selected from materials having high thermal conductivity such as but not limited to copper or silver. According to several aspects, the multiple materials may include a first material 18 having a low copper content, defining for example a copper content less than approximately 50%. The first material 18 transitions into a second material 20 having for example a high copper content, defining for example a copper content greater than or equal to 90%.

The second material 20 is located proximate to a cylinder head contact end 22 of the engagement end 16. The higher thermal conductivity provided by the greater content of increased thermal conductivity material of the second material 20 compared to the first material 18 provides a gradient of thermal conductivity increasing from the first material 18 to the second material 20 of the engagement end 16. The higher thermal conductivity provided by the second material 20 proximate to the cylinder head contact end 22 improves thermal transfer directly into a cylinder head 23, only partially shown for clarity, directly contacted by the second material 20 of the engagement end 16 when the valve seat 12 is connected to the cylinder head 23.

Referring to FIG. 2 and again to FIG. 1, the cylinder head valve seat and method for manufacturing the cylinder head valve seat 10 may further include a valve seat 24 modified from the valve seat 12. The valve seat 24 includes a valve seat surface 26 integrally joined to an engagement end 28. The engagement end 28 includes multiple materials of differing thermal conductivity similar to the engagement end 16, including a first material 30 having a thermal conductivity lower than a thermal conductivity of a second material 32. The engagement end 28 is modified from the engagement end 16 to further include positive engagement features to positively engage the engagement end 28 with a cylinder head 33 and to further increase thermal conductivity between the engagement end 28 and the cylinder head 33.

The engagement features include multiple first male members 34 extending from a first contact surface 36 of the engagement end 28 and multiple second male members 38 extending from a second contact surface 40 of the engagement end 28. According to several aspects, the first male members 34 and the second male members 38 may define dovetail-shaped members or may have other geometric shapes. The engagement features defining the first male members 34 and the second male members 38 define extensions of the same material as the second material 32 to maximize heat transfer by the engagement features directly to the cylinder head 33.

Figure 2:
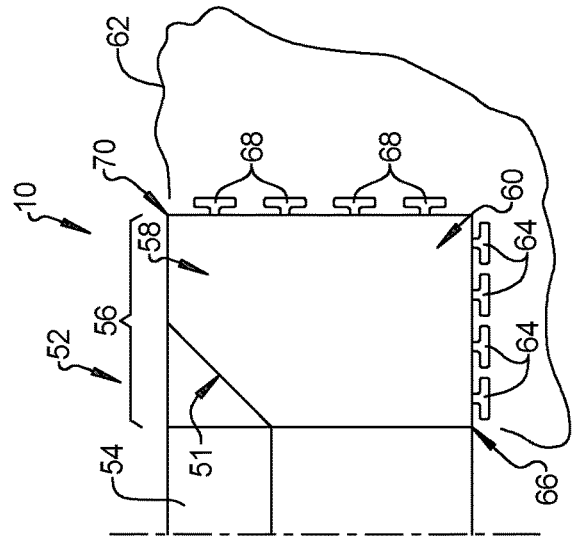
FIG. 2 is a side elevational view modified from FIG. 1 of another aspect.

Referring to FIG. 3 and again to FIGS. 1 and 2, the cylinder head valve seat and method for manufacturing the cylinder head valve seat 10 may further include a valve seat 42 modified from the valve seat 12. The valve seat 42 includes a valve seat surface 44 integrally joined to an engagement end 46. The engagement end 46 includes multiple materials of differing thermal conductivity similar to the engagement end 16, including a first material 48 having a thermal conductivity lower than a thermal conductivity of a second material 50. The engagement end 46 is modified from the engagement end 16 to further include a contact surface 51 which is contacted by a valve (not shown) generating frictional heat loading which is transferred by the first material 48 to the second material 50.

Figure 3:
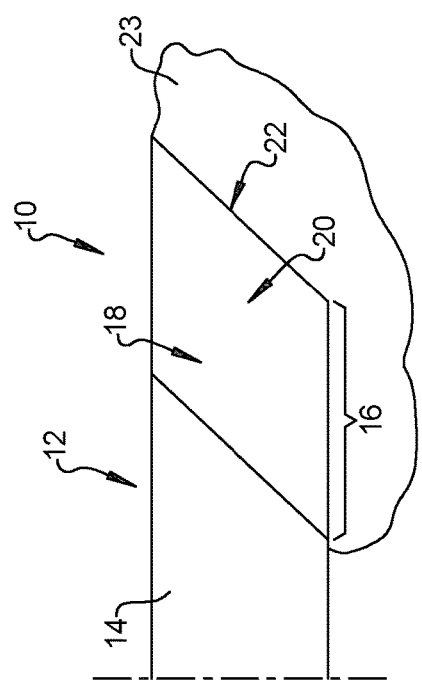
FIG. 3 is a side elevational view of a valve seat according another aspect.
Figure 4:
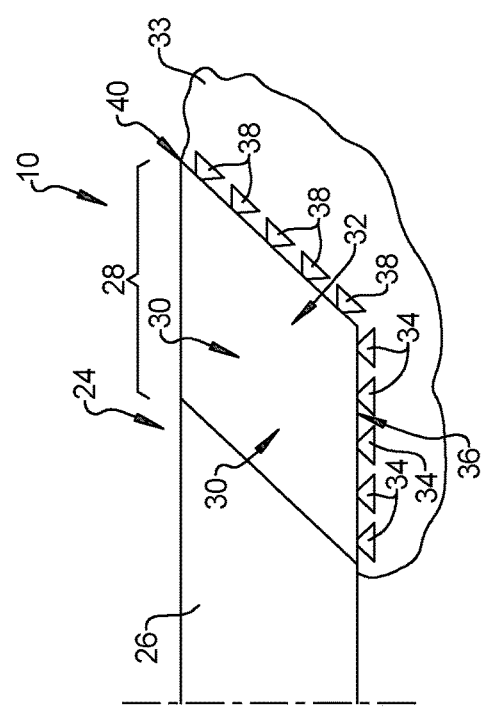
FIG. 4 is a side elevational view modified from FIG. 3 of another aspect.

Referring to FIG. 4 and again to FIGS. 1 through 3, the cylinder head valve seat and method for manufacturing the cylinder head valve seat 10 may further include a valve seat 52 modified from the valve seat 42. The engagement end 56 may be modified to further include the contact surface 51. The valve seat 52 includes a valve seat surface 54 integrally joined to an engagement end 56. The engagement end 56 includes multiple materials of differing thermal conductivity similar to the engagement end 16, including a first material 58 having a thermal conductivity lower than a thermal conductivity of a second material 60. The engagement end 56 is modified from the engagement end 46 to further include positive engagement features to positively engage the engagement end 56 with a cylinder head 62, shown only partially for clarity, and to further increase thermal conductivity between the engagement end 56 and the cylinder head 62.

According to several aspects, the engagement features include multiple first male members 64 extending from a first contact surface 66 of the engagement end 56 and multiple second male members 68 extending from a second contact surface 70 of the engagement end 56. According to several aspects, the first male members 64 and the second male members 68 may define dome or mushroom-shaped members or may have other geometric shapes. The engagement features defining the first male members 64 and the second male members 68 define extensions of the same material as the second material 60 to maximize heat transfer by the engagement features directly to the cylinder head 62.

The process of the present disclosure may include the following steps or stages. A geometry and shape of the various valve seats is initially designed and optimized using CAE tools. A material composition variation is calculated and optimized using integrated computational materials engineering (ICME) tools. The valve seat geometry and multi-material compositions defining the first materials and the second materials described herein are inputted to an additive manufacturing (AM) machine, cold spray machine, direct energy deposition (DED) device, or artificial intelligence (AI) equipped joining equipment.

When the AM machine is used, the valve seat may be printed simultaneously using different types of metal alloy powders or printed at different steps. At each printing step the same type of metal powder is used.

When the cold spray or DED processes are used for preparation of the valve seats of the present disclosure, the valve seat is deposited with different materials in a controlled manner.

A joining process may also be used between the first material and the second material. For this process the high wear resistance part defining the first material and the high thermal conductivity valve seat backside piece defining the second material are made separately and then joined together using a method such as friction welding or other joining method. After printing, the valve seats of the present disclosure may be subjected to any heat treatment as needed.

Figure 5:
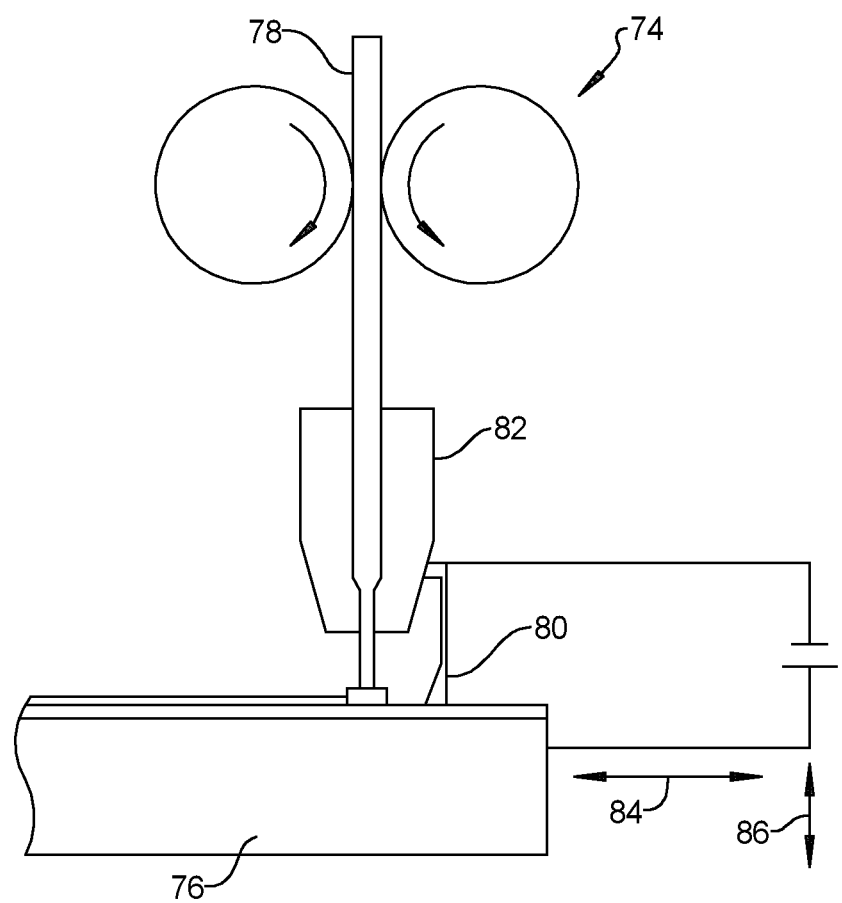
FIG. 5 is a diagrammatic presentation of an extrusion process for preparing multiple layers having a single material or multiple materials of a valve seat of the present disclosure.

Referring to FIG. 5, similar to DED, multiple metals can be extruded in the same part or onto the same substrate using an extrusion process 74. A substrate 76 can be the same material as a feedstock material 78 or a different material provided there is energy to generate a weld using a heating system 80. A heated nozzle 82 may be used to distribute the heated feedstock material 78 onto the substrate 76, which can be additively built-up in either a horizontal direction 84 or in a vertical direction 86.

Other heating elements such as lasers may also be used to promote a weld. Using a laser process allows the following: printing copper onto a nickel portion of the valve seat making the nickel portion the substrate (or vice-versa) or the valve seat may be printed using both materials that come from the same or from different print nozzles. Subsequently, the valve seat is removed from the substrate/baseplate.

The valve seats of the present disclosure may also be annealed to promote diffusion of the different materials of the valve seat. In this aspect, a small amount (as a thin layer) of nickel or nickel brass is deposited and the entire valve seat is then annealed. This creates a high nickel brass on the "high wear" portion of the valve seat that gradually becomes pure copper with subsequent wear. The present valve seat aspects also function without an annealing process wherein a wear resistant steel or other material has the copper applied to, or the reverse may also be applied if a steel alloy melting temperature is approximate to the copper substrate melting temperature. A cold sprayed material may also be built up to any arbitrary thickness on the substrate.

Selective laser melting (SLM) may be used in manufacturing valve seats of the present disclosure as the additive manufacturing method for metal. Multiple alternate material adding methods may also be used, including multi-hopper systems that allow for full three-dimensional material control and selection. Annealing may be used to allow the different materials to diffuse.

A cylinder head valve seat and method for manufacturing the cylinder head valve seat 10 of the present disclosure may include multiple materials. The materials that are proximate to a cylinder head parent material include high thermal conductivity such as copper or silver. The valve seat may be printed using metal powders with various material compositions. The valve seat may also be printed in a single step or in multiple steps to produce a multiple material structure. Powder materials used in the area near a valve seat surface may be tool steel, stainless steel, Cu—Ni alloy, various types of high chromium or cobalt alloys, tungsten alloy, nickel alloys or the like. Metal cold spray or "direct energy deposition" (DED) plus annealing may be used to produce the multi-material valve seat. The valve seat may also be joined between copper and nickel parts.

The engagement features described herein may be provided on a backside or cylinder head facing side of the valve seat, including but not limited to small pyramids, mushroom-shapes or rectangular extensions which are provided to aid in heat transfer from the valve seat to the cylinder head. With reference again to FIG. 3, a backside of the valve seat 42 may also include one or two circumferential threads 72. A matching thread (not shown) is machined into the cylinder head such as the cylinder head 62 shown in FIG. 4 during assembly to allow the valve seat 42 to be threaded or screwed into the cylinder head 62 using a threading operation during assembly.

Cylinder head valve seats of the present disclosure may be provided in 2 sections of the cylinder head valve seat: 1) A high conductivity section; and 2) a wear resistant section.

The valve seat may also be additively manufactured in total using one of: by DED (which includes cold spray); by material extrusion; by powder bed fusion; or by material jetting (also known as binder jetting when printing metal).

The cylinder head valve seat may also be manufactured as one section conventionally manufactured, including by powder metallurgy processes, and either section is printed, and the two sections are assembled together for example by joining or welding. This may be accomplished by one of: DED, which includes cold spray; material extrusion; powder bed fusion; or material jetting (also known as binder jetting when printing metal).

One of the sections of the valve seat may also be partially conventionally manufactured including by powder metallurgy processes and the other section, either the high wear section or the high conductivity section is printed on the other part directly. This may be done by one of: DED; metal powder or a solid material feed is fed to a substrate, wither a base plate or an existing part of the part being assembled which can have a complex geometry; material feed is heated by an electron beam, laser, or plasma arc to weld it to the substrate; one material is fed at a time, so different materials will be printed in discreet areas rather than blended; or if blending is required or desired, annealing can create a small amount of blending between these materials by diffusion.

Valve seats may also be manufactured by powder bed fusion, which may include: a layer of powder is distributed and fused together using a laser or electron beam; or different powders may be used layer to layer or dispensed in a grid pattern to enable varying the material in three dimensions.

Valve seats may also be manufactured by binder jet, which may include: a process similar to powder bed fusion; metal powder is bound together with an epoxy or a similar working binding agent; parts made of bound powder are sintered in a furnace, at which point it becomes a strong and isotropic metal part; with a material composition only very slightly varied over the part.

Valve seats of the present disclosure may further be manufactured by material extrusion as follows: bound metal powder is fed through a heated extruder which melts the binder to form the material into the correct geometry when it solidifies, however only one material can be fed through one extruder at a time.

A cylinder head valve seat and method for manufacturing the cylinder head valve seat 10 of the present disclosure offers several advantages. These include a valve seat made of multiple materials through a cross section of the valve seat to maximize thermal conductivity and durability. A material proximate a backside of the valve seat includes high thermal conductivity elements including copper or silver and high strength material including steel or nickel-based alloys proximate valve contact surfaces of the valve seat. The valve seat may be manufactured by one or more processes including AM, cold spray, DED, or joining. A valve seat backside surface may be smooth for press-in-place applications and may include one or two circumferential threads for mechanical assembly. The valve seat backside surface may include a dovetail/mushroom or rectangular extension design.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cylinder head valve seat of an automobile vehicle, comprising:
   a valve seat having a valve seat surface integrally joined to an engagement end; and
   the engagement end including a first material and a second material, the first material adjacent the valve seat surface and extending through the engagement end and transitioning through a gradient to the second material, wherein the first material has a thermal conductivity less than the second material, and wherein the valve seat surface is comprised of a third material different from the first material and the second material.

2. The cylinder head valve seat of the automobile vehicle of claim 1, wherein the first material has a copper content less than approximately 50%.

3. The cylinder head valve seat of the automobile vehicle of claim 2, wherein the second material has a copper content greater than or equal to 90%.

4. The cylinder head valve seat of the automobile vehicle of claim 1, wherein the first material includes silver having a first thermal conductivity and the second material includes silver having a second thermal conductivity higher than the first thermal conductivity.

5. The cylinder head valve seat of the automobile vehicle of claim 1, wherein the valve seat defines one of:
   a printing made of metal powders;
   a material extrusion; or
   a material extrusion having a subsequent annealing operation.

6. The cylinder head valve seat of the automobile vehicle of claim 1, wherein the third material includes at least one of a tool steel, a stainless steel, a copper-nickel alloy, a chromium alloy, a cobalt alloy, a tungsten alloy and a nickel alloy.

7. The cylinder head valve seat of the automobile vehicle of claim 1, wherein the valve seat includes multiple male engagement features extending from an engagement end disposed at an end of the valve seat opposite the valve seat surface.

8. The cylinder head valve seat of the automobile vehicle of claim 7, wherein the multiple male engagement features include multiple first male members extending from a first contact surface of the engagement end and multiple second male members extending from a second contact surface of the engagement end, wherein the first contact surface is disposed perpendicular to the second contact surface.

9. A cylinder head and valve seat of an automobile vehicle, comprising:
   a cylinder head; and
   a valve seat having a valve seat surface integrally joined to an engagement end, the engagement end disposed at the cylinder head, the engagement end including a first material and a second material, the first material adjacent the valve seat surface and extending through the engagement end and transitioning to the second material, the second material in contact with the cylinder head, wherein the first material has a thermal conductivity less than the second material, and wherein the valve seat surface is comprised of a third material different from the first material and the second.

10. The cylinder head and valve seat of the automobile vehicle of claim 9, wherein the second material has a copper content greater than or equal to 90%.

11. The cylinder head and valve seat of the automobile vehicle of claim 10, wherein the first material has a copper content less than 50%.

12. The cylinder head and valve seat of the automobile vehicle of claim 9, wherein the valve seat includes multiple male engagement features extending from the engagement end, the multiple male engagement features including multiple first male members extending from a first contact surface of the engagement end and in contact with the cylinder head to maximize heat transfer to the cylinder head from the engagement end.

13. The cylinder head and valve seat of the automobile vehicle of claim 12, wherein the valve seat includes at least one thread allowing installation of the valve seat using a threading operation.

14. The cylinder head and valve seat of the automobile vehicle of claim 9, wherein the valve seat defines one of:
   a printing made of metal powders having the first material transitioning into the second material; or
   a printing made using a diffusion joining process.

15. The cylinder head and valve seat of the automobile vehicle of claim 9, wherein the first material is welded to the second material defining a junction between the first material and the second material, having the valve seat annealed following welding.

* * * * *